(12) United States Patent
Rao (10) Patent No.: US 7,840,112 B2
(45) Date of Patent: Nov. 23, 2010

(54) GRADUALLY DEGRADING MULTIMEDIA RECORDINGS

(75) Inventor: Ram R. Rao, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1405 days.

(21) Appl. No.: 10/681,885

(22) Filed: Oct. 8, 2003

(65) Prior Publication Data

US 2005/0080497 A1    Apr. 14, 2005

(51) Int. Cl.
*H04N 5/91* (2006.01)
*H04N 7/00* (2006.01)

(52) U.S. Cl. .............................. 386/46; 700/94; 386/84

(58) Field of Classification Search ................... 386/46, 386/84; 700/94

See application file for complete search history.

(56) References Cited

U.S. PATENT DOCUMENTS

| | | | |
|---|---|---|---|
| 6,532,593 B1 * | 3/2003 | Moroney | 386/E5.001 |
| 7,409,146 B2 * | 8/2008 | Kawai et al. | 386/131 |
| 2002/0061181 A1 * | 5/2002 | Honjo | 386/52 |
| 2002/0141580 A1 * | 10/2002 | Okuyama | 380/201 |
| 2003/0031460 A1 * | 2/2003 | Obrador | 386/52 |
| 2003/0147631 A1 * | 8/2003 | Zimmermann | 386/95 |
| 2003/0198458 A1 * | 10/2003 | Greenwood | 386/46 |

* cited by examiner

*Primary Examiner*—Thai Tran
*Assistant Examiner*—Girumsew Wendmagegn
(74) *Attorney, Agent, or Firm*—Schwabe, Williamson & Wyatt, P.C.

(57) ABSTRACT

A system including a recording device in which multiple lesser quality recordings of a program, e.g., recordings at a reduced bit rate, are determined by transcoding a high quality version of the program. Since transcoded recordings are determined with respect to the high quality version, they will have the best quality available for a given bit rate. The system allows a user to manage recordings by associating retention policies and relative ranking attributes with recordings, where a policy manager may use these associated policies and attributes to select which high and lesser quality copies of the program are retained over time, thus gradually degrading retained copies in accord with user preferences.

16 Claims, 6 Drawing Sheets

FIG. 8

GRADUALLY DEGRADING MULTIMEDIA RECORDINGS

FIELD OF THE INVENTION

The invention generally relates to multimedia recording devices, such as video recorders which may digitally record program broadcasts, and more particularly to recording devices that may gradually degrade or reduce available quality of digital recordings to free up the recorder's storage space.

BACKGROUND

It is becoming common that cable television (CATV) systems, satellite television systems (SATV), and other multimedia environments, are providing digital video recorder (DVR) devices that may be used to record broadcasts. The DVR may be incorporated into a "set-top box," e.g., a device responsible for breaking the CATV, SATV, etc. broadcast signal into selectable channels for presentation on appropriate multimedia hardware, e.g., a television, stereo, etc., or the DVR it may be in a separate device operating in conjunction with the set-top box, such as a recording device offered by TiVo Inc. of Alviso, Calif.

Figure 1:
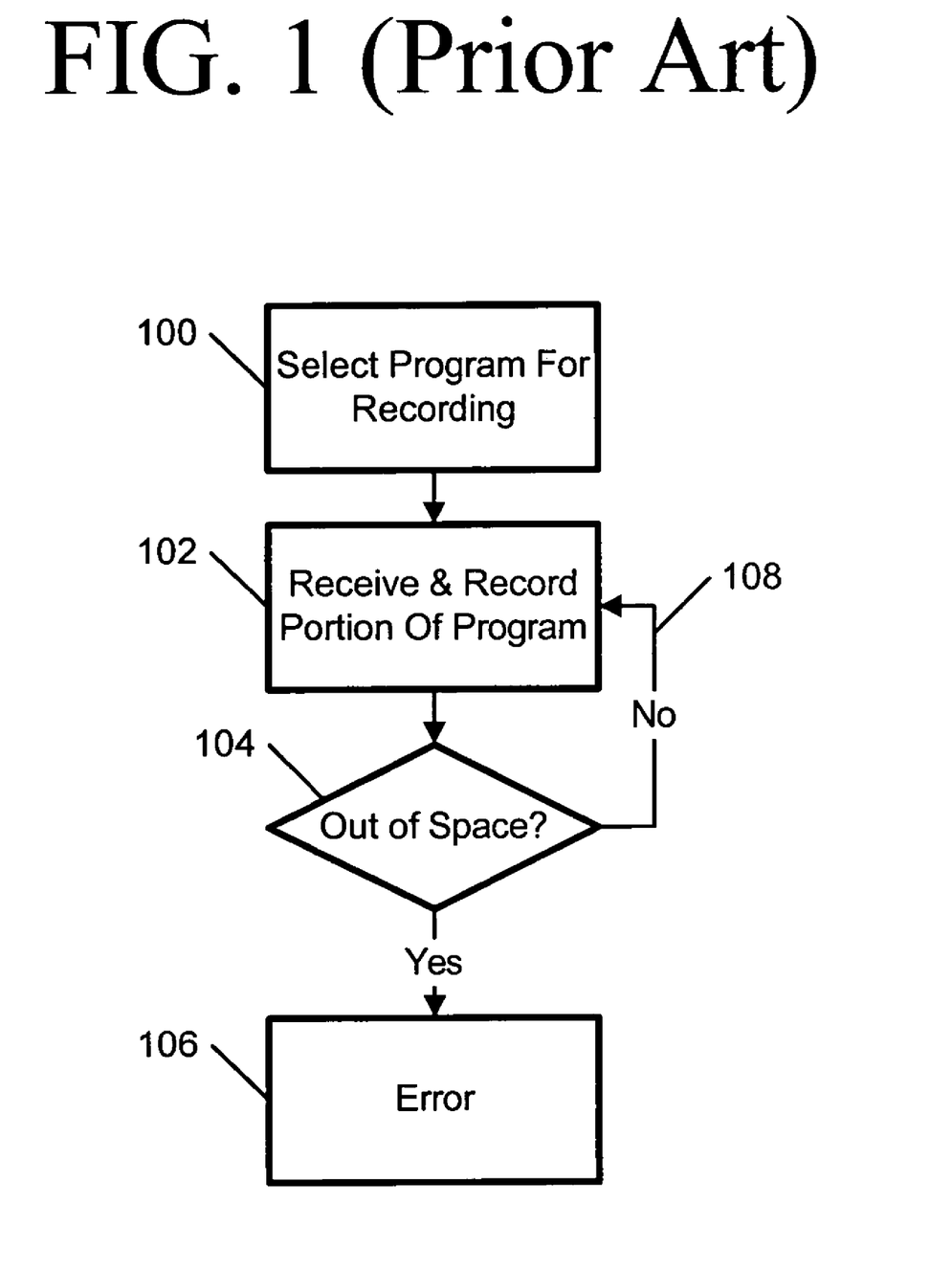
FIG. 1 illustrates a prior-art video recording environment.

FIG. 1 illustrates a prior-art video recording environment. Conventional DVRs typically operate by allowing a viewer/DVR user to select 100 a show for recording, such as by way of selecting the show off of an electronic program guide (EPG). When the selected show is being broadcast, the DVR receives 102 and records some portion of the show. The recording is made to some mass storage device, such as a 30 or 60 gigabyte hard drive. Unfortunately, even with data compression, DVRs often have insufficient storage to archive many past and/or current broadcasts of interest to a viewer. If the DVR determines 104 that the DVR has run out of space while recording 102 the show, an error occurs. If the DVR has not run out of recording space, then recording continues 108 until complete.

BRIEF DESCRIPTION OF THE DRAWINGS

The features and advantages of the present invention will become apparent from the following detailed description of the present invention in which.

DETAILED DESCRIPTION

In the description that follows, a personal video recorder (PVR) is disclosed allowing consumers, e.g. program viewers, to record television shows and other broadcast data to a local mass storage device. It is assumed the PVR records television broadcasts and other multimedia data in a digital format to a hard drive, however it will be appreciated that other recording formats and hardware may be used. Broadcasts may be received from any data source, including CATV, SATV, terrestrial broadcast, wired or wireless computer network, the Internet, etc. It will be appreciated that the PVR is not limited to video data, and in addition to recording television shows, that the PVR may also record a variety discretely identifiable data, including electronic program guides, computer software, and other data having a predefined size and/or broadcast time slot. However, for expository convenience, the following discussion focuses on receiving and recording television shows.

Recording a program to a hard drive allows at least two benefits. A first is ability to time-shift viewing the program. A second is allowing a broadcast currently being viewed to be manipulated as if already recorded, e.g., it may be paused, where further received data is spooled to the hard drive, or rewound so that previously recorded portions may be reviewed, or fast forwarded up to the current recording point for the program, etc. However, since programs are being recorded to storage having finite size, the PVR requires a mechanism to manage the lifetime of content on the hard drive. Without intervention, available recording space eventually will be fully consumed as discussed above with respect to FIG. 1. In illustrated embodiments, to delay filling up the hard drive, a storage manager can be used that monitors recorded data and that applies one or more policies designed to automatically reduce storage requirements.

Figure 2:
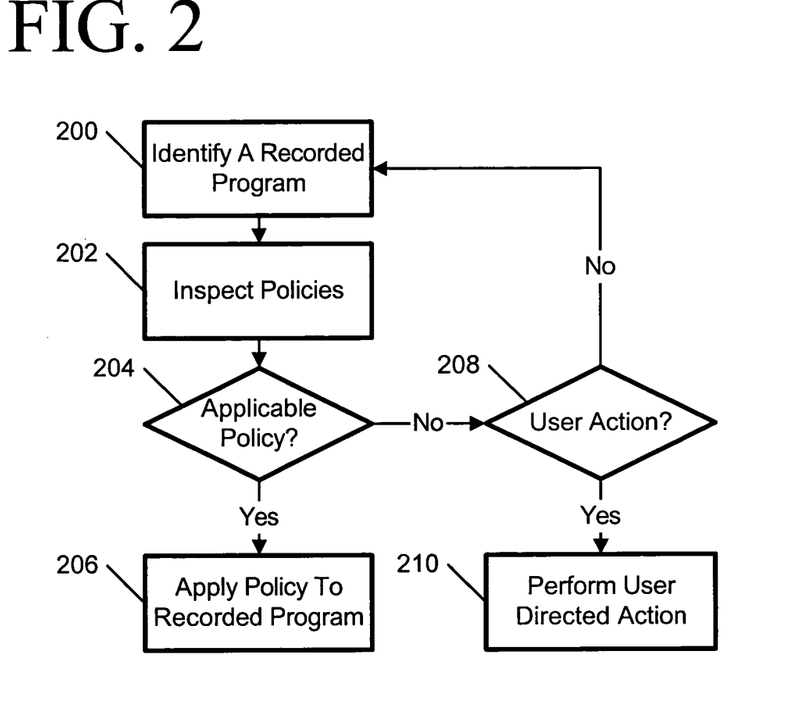
FIG. 2 illustrates an exemplary flowchart according to one embodiment for applying policies to recorded programs.

FIG. 2 illustrates an exemplary flowchart according to one embodiment for applying policies to recorded programs. Policies may include general system policies to be applied to all recordings, as well as targeted policies that may be associated with a recorded program or program to be recorded, e.g., policies may be associated with programs while scheduling a recording, associated with a previously scheduled recording, as well as associated with a recording in process or already completed. In the illustrated embodiment, it is assumed that the storage manger identifies 200 a recorded program to which one or more policies are applied. It will be appreciated, however, that in another embodiment, policies may be selected first and programs then identified that are subject to the policy.

System level and/or targeted policies are then inspected 202 to determine which one or ones apply to the identified 200 program. An exemplary system level policy may be to automatically delete all programs after some period of time, e.g., 2 days, unless the program has been flagged as being special. Such a policy provides for automatically freeing hard drive space for new recordings. A variation would be to first-delete after the period of time programs that have been viewed, thus delaying automatic deletion of unseen programs. Other system policies may be defined for program types/classes to order automatic deletions according to user interests, e.g., a system policy may indicate automatically deleting soap operas first, then talk shows, then kids shows, then science shows, etc.

Targeted policies and/or attributes may be associated with a particular program to control its retention, and (perhaps optionally) to override system level policies. For example, one policy may indicate an associated program is to be kept at least until a certain date. Another policy may indicate that an associated program is never to be deleted unless manually deleted. Attributes associated with a program may include designating a recording as being "long," "medium," or "temporary" term, thus allowing a relative ranking of the importance of a particular recording as against other recordings. Thus, if in order to satisfy a policy only one of two stored programs needs to be deleted to make room for a new recording, a "temporary" term recording would be deleted before deleting a "long" term recording.

Another policy, which may be applied as a general system policy, or as a targeted policy, is a policy directing that a recording be gradually degraded over time. Degrading quality may occur in a variety of ways, and may depend on how the program is recorded on the hard drive. For example, assuming a single recording of a program has been made at a certain quality level (bit rate) level, the policy may direct that the recording be dynamically re-recorded at a lower quality setting to free up storage space (see FIG. 3). If multiple recording qualities of the program have been recorded (see FIG. 4), the policy may direct that one of the quality levels be deleted to free storage space. Then, as time progresses (see FIG. 7), successive highest quality level recordings may be deleted while still leaving a recording of some quality available for viewing.

It will be appreciated that the above described policies are exemplary only, and many other system and targeted policies may be used, and that policies may be associated with programs as well as users. That is, assuming user identify is known or may be inferred, e.g., such as from usage patterns, more restrictive policies may, for example, be applied to recordings associated with children.

If 204 a policy is determined to be applicable to the identified 200 program, then the policy is applied to the program in accord with the policy, e.g., the program is deleted, re-recorded, one of multiple recordings deleted, etc. If no policy is determined as being applicable, then optionally as shown in the illustrated embodiment, a user may be prompted to see if 208 manual user action is desired, e.g., does a user want a certain action performed on the recording. Of course, since the PVR is likely operating automatically, prompting the user may occur in a variety of ways, including temporarily displaying a dialog to gain the attention of a user if any is present, displaying a symbol on a television display (or other output) indicating user action is solicited, or taking other action to log or otherwise notify a user. Assuming user action is desired, the user action may then be performed 210.

Figure 3:
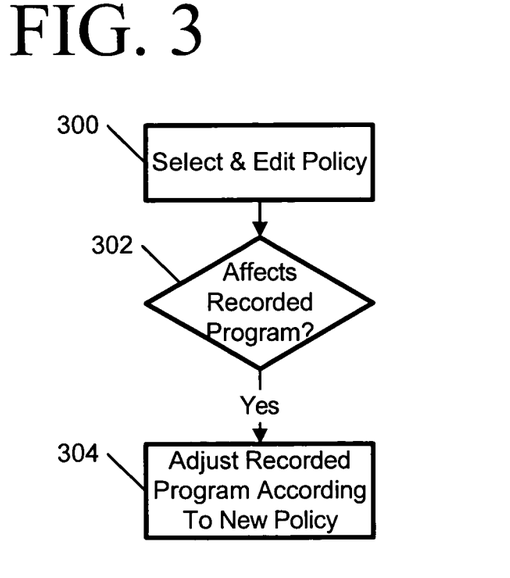
FIG. 3 illustrates an exemplary flowchart according to one embodiment for editing a policy and adjusting stored programs.

FIG. 3 illustrates an exemplary flowchart according to one embodiment for editing a policy and adjusting stored programs. As discussed above, various system and targeted policies may be defined and applied to programs that have already been recorded, are to be recorded, or that are currently being recorded. On occasion, it may be convenient to alter the terms of an existing policy.

For example, assume a system level policy is presently in place requiring recorded programs to be re-recorded after two weeks as a lower-quality recording. This policy may be deemed too lax and thus selected 300 for editing with a policy editor component of the PVR or other device having access to the hard drive, e.g., a computer. After editing the policy, such as to change the two week timeout into a five day timeout, a test may be performed to determine if 302 the change affects any stored programs. For example, there may be programs that were recorded at least five days ago, but that have not yet been stored for two weeks, and these programs, according to the revised policy, now require re-recording at a lower quality.

After determining the editing affects a recorded program, the recorded program is then adjusted 304 according to the terms of the edited policy. It will be appreciated that there may be any number of policies regarding recorded programs. It is assumed editing a policy results in affected recordings being appropriately altered in accord with changes to a policy.

Figure 4:
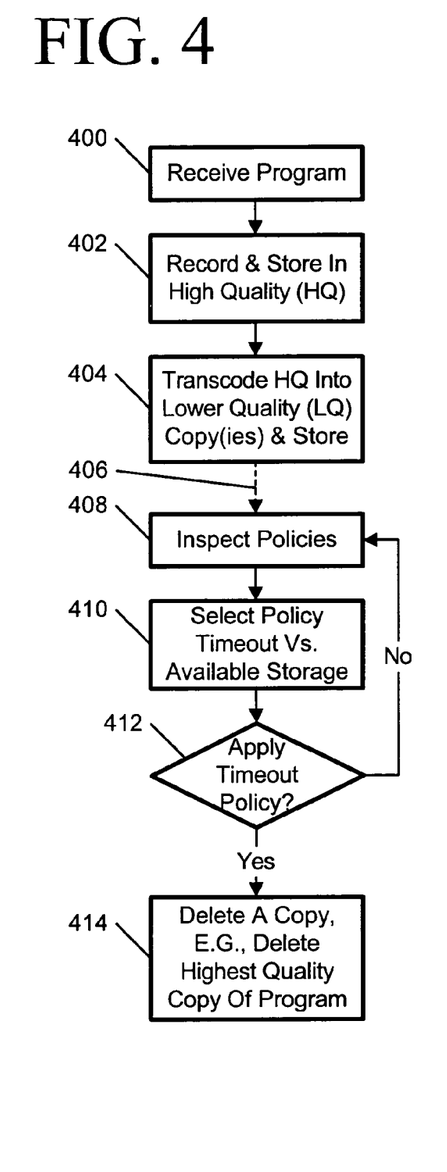
FIG. 4 illustrates according to one embodiment a flowchart illustrating receiving a program, recording it with multiple quality levels, and applying existing policies to recorded programs.

FIG. 4 illustrates according to one embodiment a flowchart illustrating receiving a program, recording it with multiple quality levels to a hard drive, and applying existing policies to recorded programs.

As illustrated, a first operation is receiving 400 a program, such as a broadcasted television program, and. As discussed above, a policy may be employed to automatically delete certain quality levels to free up storage space. As illustrated, the received program is recorded 402 and stored in a high-quality (HQ) mode. In a digital transmission environment, storing the HQ copy may simply entail writing the received digital transmission to the hard drive. In an analog environment, the received program required conversion to digital. In addition to storing the HQ copy, one or more lower-quality (LQ) copies may also be determined and stored. As illustrated, the received 400 program is transcoded 404 into the LQ copy or copies for storage.

In some embodiments, programs may be recorded with four quality levels, one being the HQ copy, along with three LQ copies. In these embodiments, the HQ copy is stored using approximately eight megabytes of data to encode an hour of a recording, and each LQ copy respectively encodes an hour of the program with four, two, and 1 megabyte, where one megabyte per hour represents the worst quality recording that may be available for viewing. As will be appreciated by one skilled in the art, reduction in data storage requirements necessarily require loss of detail and typically results in visual artifacts. In a digital transmission environment, each LQ copy is derived from the received 400 program, rather than from another LQ copy. In an analog environment, the LQ copies are each derived from the initial HQ copy. In such fashion, the errors/data loss inherent to transcoding the program into one LQ copy may be minimized by working with the best available representation of the program.

Although illustrated embodiments show storing copies of a program as separate copies of some quality, it will be appreciated that the copies may be stored as a single scalable bitstream, e.g., a video sequence having multiple streams corresponding to different levels of detail for the video sequence, where choosing a all or a subset of the levels of detail results in a different valid bitstream which will play back with different quality. For example, a resolution scalable bitstream may have a "base layer" that corresponds to a standard-definition (720×480) video sequence, and an "enhancement layer" that provides additional information needed to represent a high-definition version of the same signal. When the full scalable bitstream (base+enhancement layer) is available, either the high definition broadcast or the standard definition broadcast may be viewed. If the enhancement layer is deleted, e.g., to free up storage space, the remaining standard definition version could be viewed. Generically, the video bitstream includes a number of layers, where deleting a higher "enhancement" layers degrades stored quality.

Or, for example, the program copies may be recorded as a MPEG-4 (Moving Picture Experts Group) Fine Granularity Scalable (FGS) data stream, which encodes video frames into multiple layers, including a base layer of lower quality video along with several enhancement layers containing increasingly more detailed video data to enhance the base layer and provide resulting video of increasingly higher quality. A video bitstream may be created such that any number of bytes may deleted from certain portions of the bitstream, with the effect that the video slowly degrades, but is still a valid sequence. So for example, if a single video frame contains 1000 bytes, the last 400 bytes may be deleted to leave a 600 byte frame with reduced quality. It will be appreciated these are exemplary scalable bitstream examples, and that other scalable bitstream techniques may be employed, and that retention policies, degradation policies, etc. are applicable to individually stored copies of a program as well as scalable bitstreams.

After recording the program with HQ and transcoded LQ copies (dashed arrow 406 represents possible passage of time, e.g., seconds, hours, days, etc. until a policy is applicable), as discussed above with respect to FIG. 2, available policies are inspected 408 to see what policies (if any) are applicable to the recorded programs, and one is selected 410.

In the illustrated embodiment, the selected policy is a "Timeout vs. Available Storage" policy. For the purposes of this illustration, it is assumed the policy compares recording times with storage space, and when storage space is deemed to be running low, certain recordings are deleted to make room for new recording. This process is illustrated and discussed with respect to FIG. 7. It will be appreciated that various techniques may be employed in determining a low space condition, such as available storage space, percentage of available storage space, estimated storage space required for future scheduled recordings versus available storage space, etc. It will be appreciated available storage space may be determined at a particular moment in time, e.g., what is available as a policy executes, or determined with respect to estimated future free space due to policies to be applied in the future.

Thus, a test is performed to determine if 412 the Timeout vs. Available Storage policy should be applied to the recorded 402, 404 program. If the policy is to be applied to the recorded program, then a copy of the program is deleted 414. Or, in the case of scalable bitstreams, an enhancement layer may be deleted, or one or more layers recoded to a lesser quality. In one embodiment, the Timeout vs. Available Storage policy operates by identifying the highest stored copy of the program and then deleting that copy. Thus, if a program was stored with four quality levels using eight, four, two and 1 megabytes of data to encode an hour of the program, if all four quality levels were available on the hard drive, applying the policy results in deleting the eight megabyte per hour copy of the program.

Figure 5:
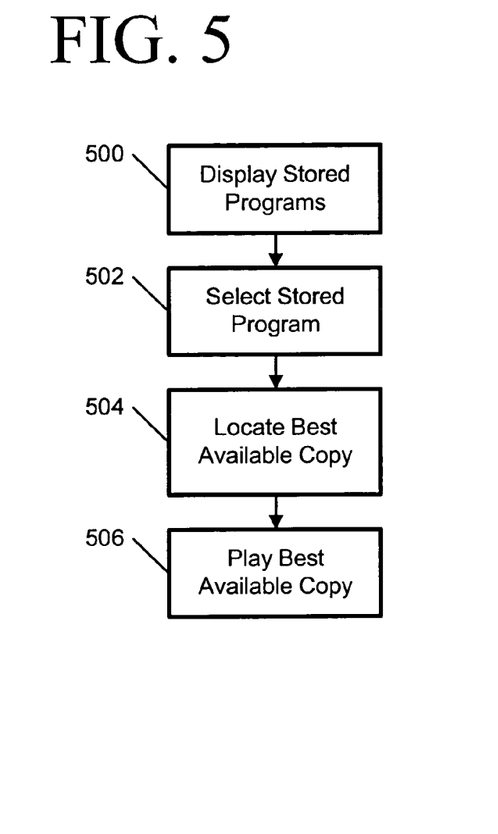
FIG. 5 illustrates according to one embodiment a flowchart for playing a recorded program.

FIG. 5 illustrates according to one embodiment a flowchart for playing a recorded program. Assuming the program has been recorded with multiple quality levels as discussed with respect to FIG. 4, an initial operation is to display 500 stored programs. For example, assuming a PVR has an associated remote control device, the remote control device may have a button, which when activated, results in a menu being displayed on an output device such as a television or other output that lists previously recorded programs. Of course, the PVR may also have controls thereon for performing some or all functions available on a remote control, and/or an Application Programming Interface (API) or equivalent data conduit allowing the contents of the hard drive to be accessed by another device.

A stored program is selected 502, e.g., by way of the remote, controls on the PVR, programmatically by another device, etc., and responsive to selection, a search of the hard drive is performed to identify 504 the best available copy of the selected program. The best available copy is then played.

Figure 6:
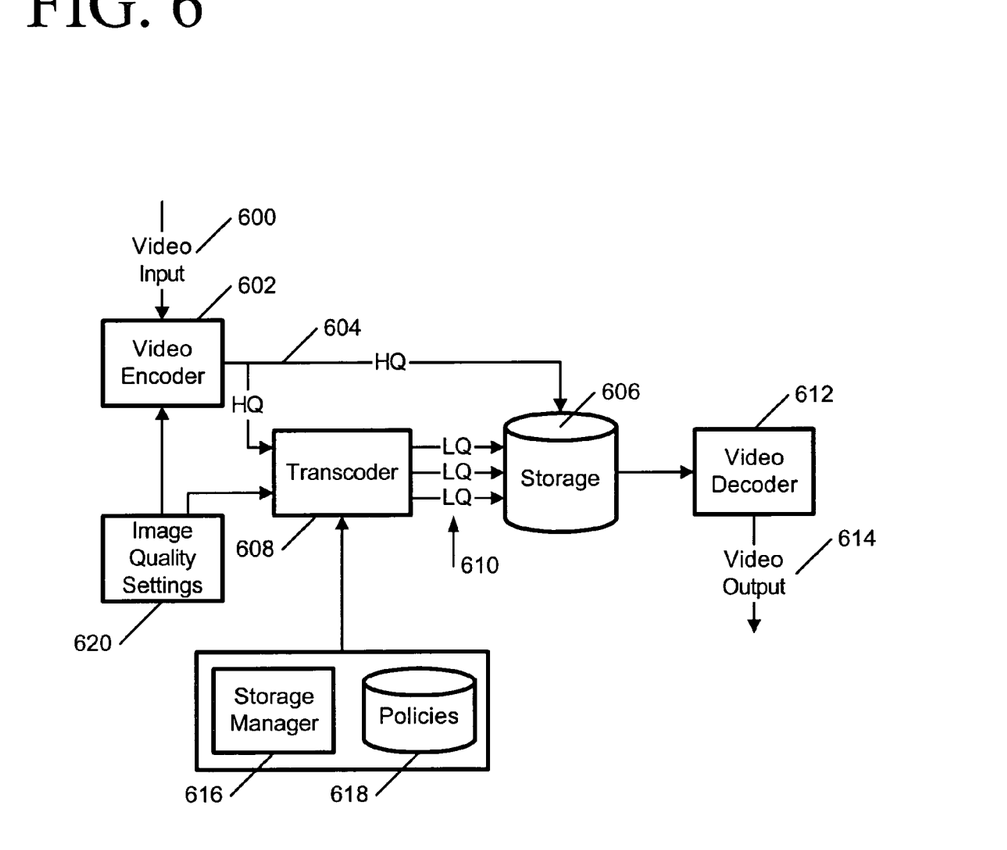
FIG. 6 illustrates an exemplary system for implementing a personal video recorder (PVR) according to one embodiment.

FIG. 6 illustrates an exemplary system for implementing a personal video recorder (PVR) according to one embodiment. In the illustrated embodiment, a program is recorded using multiple copies of the program at varying quality levels. These quality levels are all determined with respect to an input video signal 600 for a program to be recorded. The input is received by a video encoder 602. Output 604 from the video encoder is a digital representation of the program corresponding to the HQ encoding of the program discussed above, this is the baseline or "best" quality digital copy of the program.

It will be appreciated that the input video signal may be an analog signal, an analog signal encoding digital data, or a digital signal, depending on the transmission environment carrying the signal. If the input is digital, then the video encoder may essentially operate as a pass-through device, performing little if any alteration to the input. However, if the input is analog, then the video encoder is presumed to perform an analog-to-digital conversion. If the input is an analog encoding of a digital signal, the video encoder is presumed to extract the digital signal from the analog input. The HQ output of the video encoder is stored in a hard drive 606. In one embodiment the output is an MPEG encoding of the video input. For more information about MPEG encodings, see the MPEG Standards web page at Internet URL (uniform resource locator) www#chiariglione#org/mpeg/standards#htm (to prevent inadvertent hyperlinks, periods in the preceding URL were replaced with hash marks).

The video encoder HQ output is also provided to a transcoder 608 which converts the input into multiple LQ copies 610 corresponding to encodings of the input 600 HQ at lesser quality bit rates than used for the HQ copy of the input. It will be appreciated that the transcoder may operate in real time, or in a delayed processing mode in which the HQ copy is processed later, perhaps overnight during idle-time. The transcoder output is also stored in the hard drive 606. When a viewer/user elects to view the received program, as discussed with respect to FIG. 5, a highest quality version of the program currently stored on the hard disk is retrieved and provided to a video decoder 612. The video decoder is responsible for converting, if necessary, the stored digital representation of the program into a video output 614 format suitable for display. It will be appreciated that a display may be capable of directly receiving the digital representation of the program read from the hard disk 606, and consequently the video decoder may essentially operate as a pass-through device, performing little if any alteration to the output.

In addition to these basic components, in the illustrated embodiment there is also a storage manager 616 responsible for applying data retention policies 618 to programs stored in the hard disk 606. As discussed with respect to FIGS. 2-4, the storage manager compares available policies with stored programs, and if a policy is applicable, then a stored program is adjusted or deleted in accord with the policy. As discussed above, based on policies associated with recorded programs, the storage manager may monitor utilization of the hard drive, and when space is needed, the storage manager will delete a version of a show to free up space. The storage manager will choose the show version to delete based on the policy mechanism and the amount of space that will be freed when deleting the content. While the storage manager is illustrated as accessing policies 618 in a data store separate from the hard disk 606, it will be appreciated that the policies may be stored in the hard disk.

In the illustrated embodiment, initial quality settings 620 may be input by a user for each show that is to be recorded, or selected by default. These quality settings influence the bit rate and thus disk usage of the various recorded copies of the program, e.g., the settings determine the recording of a program at 8/4/2/1 megabytes per hour. It will be appreciated that these recording bit rates are arbitrarily selected for expository convenience and that other bit rates may be used. Additionally, it is not required that the same bit rate be employed throughout a program recording, e.g., less desirable portions of a program such as commercials may be recorded at a lesser quality bit rate.

As discussed above with respect to FIG. 2, various policies and attributes may be associated with a recorded program, affecting how the program is deleted to satisfy policies. For example, if a user chooses image quality settings 620 indicating a desire to record a program at high quality and to designate it a "long" term recording, the content would be recorded at multiple bit rates, and the high bit rate versions would be saved for a longer period of time. But, if the user chooses to record at high quality but only designates the recording as "medium" term, the same bit rates may be used to encode the recording, but the higher bit rate clips would be deleted more quickly. The storage manager 616 uses data from both the quality settings and associated longevity attributes or policies to determine which versions of the video content to delete when space is needed.

Figure 7:
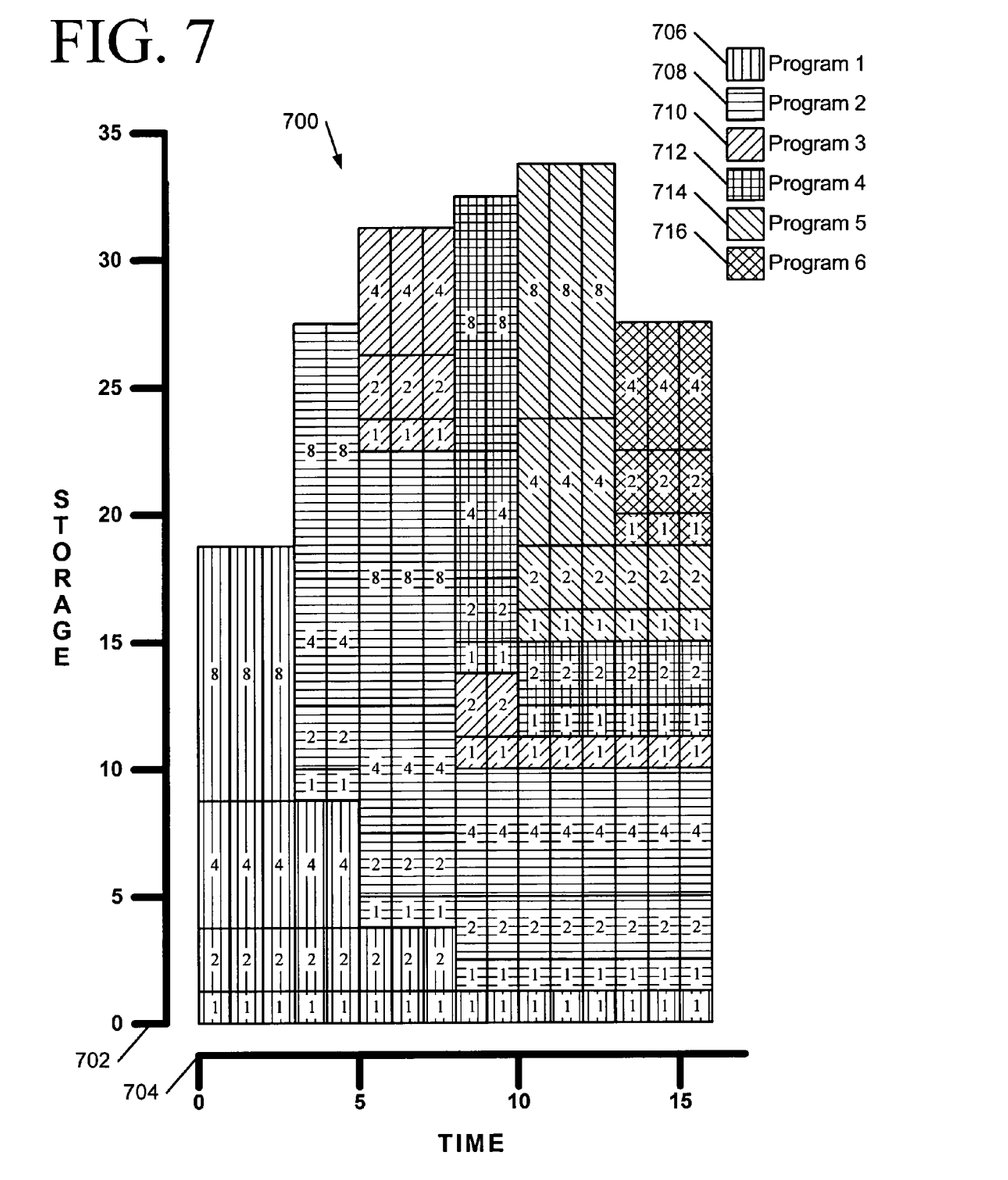
FIG. 7 illustrates a chart according to one embodiment in which storage usage is shown over time as new programs are recorded.

FIG. 7 illustrates a chart 700 according to one embodiment in which storage 702 usage is shown over time 704 as new programs are recorded. In the illustrated embodiment, it is assumed that a user has associated initial quality settings (see FIG. 6 item 620) with a recording, e.g., quality and longevity settings, where a high quality recording means the HQ copy of a program utilizes eight GB per hour of recording and three LQ copies are recorded respectively utilizing four, two and one GB per hour, and a medium quality recording utilizes four GB per hour for the HQ recording and two LQ copies are recorded respectively utilizing two and one GB per hour.

If a first program 706 is recorded at high quality and medium longevity, in the illustrated embodiment, four copies of the program are stored occupying respectively one, two, four and eight gigabytes (GBs), for a total of 15 GB for all versions. When a second program 708 show is recorded at high quality and long longevity, because the second program is ranked higher relative to the first program, the eight GB version of the first show is deleted to free up space for the second program. At this time, if a user elects to watch the first program 706, they four GB copy of the program will be viewed. If the third 710 and sixth 716 programs are recorded with good quality and short longevity, only four, two, and one GB copies of the programs are initially stored. If the fourth 712 and fifth 714 programs are recorded at high quality and short longevity, these are both initially recorded with eight GB HQ copies.

The illustration shows how a PVR system may balance longevity and disk usage to keep versions of programs available as long as possible at quality levels maximized to the interest of a user's designated interests. For example, since the second program 708 was designated high quality and long longevity, its highest quality recording was retained on disk longer than the first program's 706 highest quality recording. It is only after a week or so that the second program's highest quality recording is deleted to make room for the fourth program 712. Note that the second programs' long term four GB copy is retained while the third program's 710 short term four GB copy is deleted. Also note that even though disk space has been freed multiple times in the illustrated embodiment, all siz programs remain available on the PVR, albeit at varying degraded qualities as compared to the original video encoder output.

Figure 8:
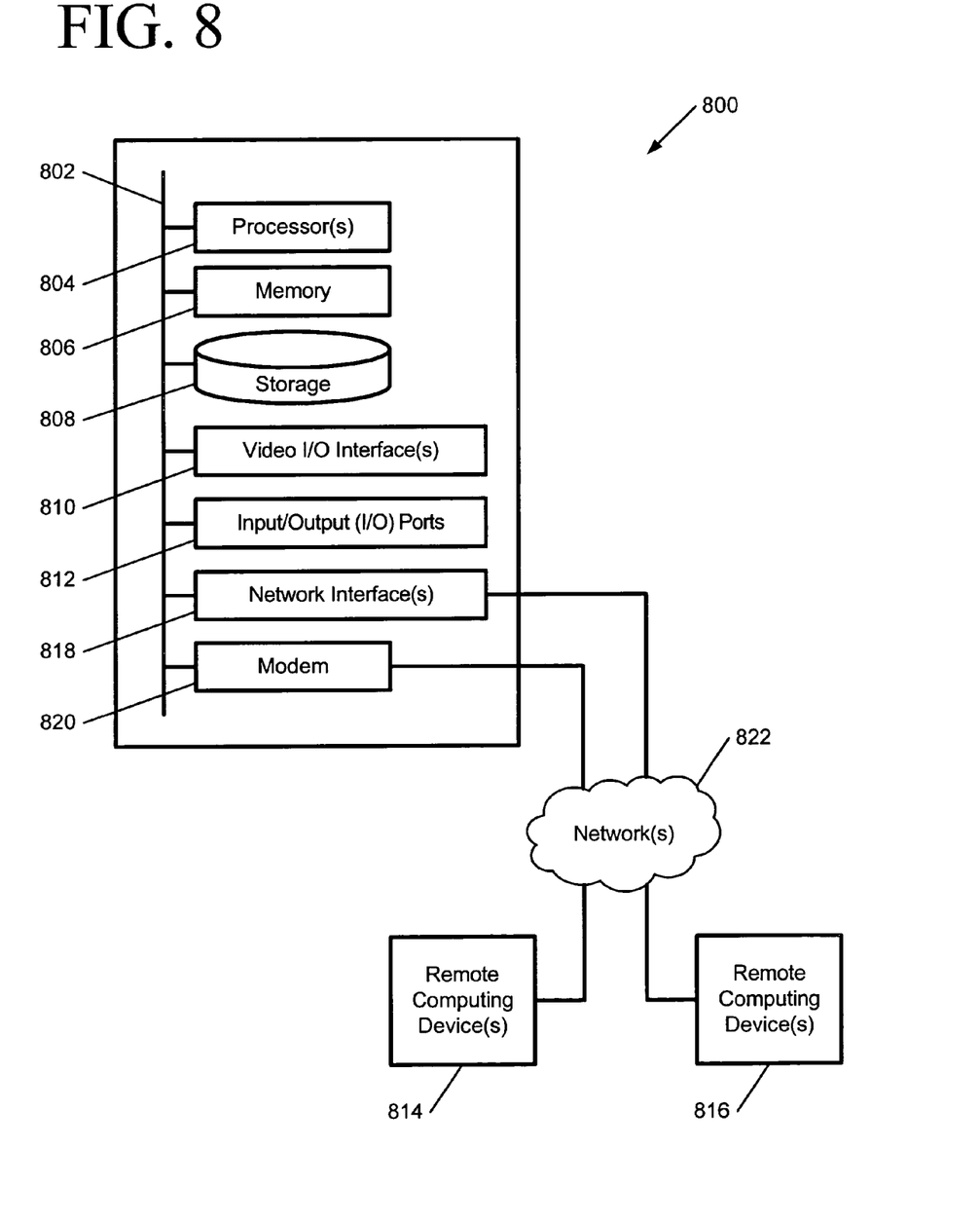
FIG. 8 illustrates a suitable computing environment in which certain aspects of the invention may be implemented.

FIG. 8 and the following discussion are intended to provide a brief, general description of a suitable environment in which certain aspects of a PVR may be implemented.

As used herein below, the term "machine" is intended to broadly encompass a single machine, e.g., an entirely self-contained PVR, or a system of communicatively coupled machines or devices operating together, e.g., one device may comprise the FIG. 6 video encoder 602, storage 606, transcoder 608, and video decoder 612, while a separate communicatively coupled device comprises the storage manager 616 and/or policies 618. Exemplary machines include computing devices such as set-top boxes, personal computers, workstations, servers, portable computers, handheld devices, e.g., Personal Digital Assistant (PDA), telephone, tablets, etc.

An exemplary machine 800 embodying a PVR typically includes a system bus 802 to which is attached one or more processors 804, memory 806, e.g., random access memory (RAM), read-only memory (ROM), or other state preserving medium, storage devices 808, video interface 810, e.g., for video input or video output, and input/output interface ports 812. The machine may be controlled, at least in part, by input from conventional input devices, such as remote controls, buttons on the PVR, keyboards, mice, etc., as well as by directives received from another machine, a virtual reality (VR) environment, biometric feedback, or other input or signal.

The machine may include embedded controllers, such as programmable or non-programmable logic devices or arrays, Application Specific Integrated Circuits, embedded computers, smart cards, and the like. The machine may utilize one or more connections to one or more remote machines 814, 816 delivering data to or otherwise interacting with the machine, such as through a network interface 818, modem 820, or other wired or wireless communicative coupling. Machines may be interconnected by way of a physical and/or logical network 822, such as an intranet, the Internet, local area networks, and wide area networks. It will be appreciated that communication with network 822 may utilize various wired and/or wireless short range or long range carriers and protocols, including satellite, microwave, radio frequency (RF), Institute of Electrical and Electronics Engineers (IEEE) 802.11, Bluetooth, optical, infrared, cable, laser, etc.

The invention may be described by reference to or in conjunction with associated data including functions, procedures, data structures, application programs, etc. which when accessed by a machine results in the machine performing tasks or defining abstract data types or low-level hardware contexts. Associated data may be stored in, for example, volatile and/or non-volatile memory 806, or in storage devices 808 and their associated storage media, including hard-drives, floppy-disks, optical storage, tapes, flash memory, memory sticks, digital video disks, etc. Associated data may be delivered in the form of packets, serial data, parallel data, propagated signals, etc., and may be used in a compressed or encrypted format. Associated data may be used in a distributed environment, and stored locally and/or remotely for access by single or multi-processor machines.

Having described and illustrated the principles of the invention with reference to illustrated embodiments, it will be recognized that the illustrated embodiments can be modified in arrangement and detail without departing from such principles. And, though the foregoing discussion has focused on particular embodiments, other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto.

What is claimed is:

1. A method for storing a received program, comprising:
storing, by a computing device, the received program as a first digital copy having a first quality level on a storage medium;
converting, by the computing device, the first digital copy directly into a second and a third digital copy of the received program, having a second and a third quality level respectively, wherein the third quality level is lower than the second quality level, and the second quality level is lower than the first quality level;
storing, by the computing device, the second and the third digital copy along with the first digital copy on the storage medium; and
after a period of time during which all copies are available for a potential replaying, applying, by the computing device, a retention policy associated with the program to delete at least one of the stored first, second and third digital copies.

2. The method of claim 1, further comprising:
receiving, by the computing device, a request to schedule a recording of the program;
determining, by the computing device, a recording quality and a longevity for the program; and
associating, by the computing device, the recording quality and longevity with the program;
wherein applying the retention policy is performed based at least in part on the associated desired longevity.

3. The method of claim 2, wherein the recording quality comprises high, medium and low quality.

4. The method of claim 2, wherein determining the quality and longevity comprises a selected one of: utilizing a default quality and longevity or prompting for the desired quality and longevity.

5. The method of claim 2, wherein longevity comprises long, medium, and temporary, and wherein applying the retention policy further comprises comparing associated quality settings and longevity to determine which stored copy of the program is to be deleted.

6. The method of claim 1, further comprising:
receiving, by the computing device, a request to schedule a recording of the program, the request having an associated quality to utilize for recording the program; and
inferring, by the computing device, a longevity for the recording based on the associated quality.

7. The method of claim 1, further comprising:
determining, by the computing device, a bitrate and an encoding format for each of the first, second and third digital copies, wherein the first, second and third quality levels are determined based at least in part on the corresponding bitrates and the encoding formats utilized.

8. The method of claim 1, wherein the first, second and third quality levels are determined based at least in part on a respective bitrate utilized to encode the first, second and third digital copies.

9. The method of claim 1, wherein the first, second and third quality levels are determined based at least in part on a respective encoding format utilized to encode the first, second and third digital copies.

10. A personal video recorder (PVR), comprising:
a video encoder configured to encode an input signal corresponding to a program into a higher quality copy of the program and store the higher quality copy on a storage medium;
a transcoder configured to directly convert the higher quality copy of the program into at least two copies of the program with progressively lower quality stored along with the higher quality copy on the storage medium; and
a storage manager configured to periodically apply a retention policy to delete one or more copies of the program.

11. The PVR of claim 10, wherein the transcoder is configured to store the higher and at least two lower quality copies of the program as components of a scalable bitstream.

12. The PVR of claim 10, wherein the storage manager is configured to delete the higher quality copy of the program from the storage after a period of time during which all copies are available for a potential replaying for a user.

13. The PVR of claim 10, further comprising:
a video decoder configured to be used in conjunction with retrieving a best available copy of the program from the storage, and configured to convert the best available copy of the program into an output format suitable for presentation to a display.

14. An article of manufacture comprising
a non-transitory tangible machine accessible storage medium having stored thereon a plurality of machine executable instructions, wherein the instructions are configured to cause an apparatus, in response to execution of the instructions by the apparatus, to perform operations comprising:
storing in the storage medium the received program as a first digital copy having a first quality level;
converting directly the first digital copy into a second and a third digital copy of the received program having a second and a third quality level respectively, wherein the third quality level is lower than the second quality level, and the second quality level is lower than the first quality level;
storing the second and the third digital copy in the storage medium along with the first digital copy; and
after a period of time during which all copies are available for a potential replaying, applying a retention policy to delete at least one of the stored first, second and third digital copies.

15. The article of claim 14, wherein the operations further comprise:
receiving a request to schedule a recording of the program;
determining a desired recording quality and a longevity for the program; and
associating the quality and longevity with the program;
wherein said applying includes applying the retention policy based at least in part on the associated desired longevity.

16. The article of claim 14, the operations further comprise:
determining a first bitrate for encoding the first digital copy; and
determining a second bitrate for encoding the second digital copy; and
determining a third bitrate for encoding the third digital copy;
wherein the first, second and third quality levels are respectively determined based at least in part on the first, second and third bitrates.

* * * * *